(No Model.) 2 Sheets—Sheet 1.

H. C. HIGGINSON.
MANUFACTURE OF PLASTER.

No. 519,259. Patented May 1, 1894.

(No Model.)　　　　　　　　　　　　　　2 Sheets—Sheet 2.
H. C. HIGGINSON.
MANUFACTURE OF PLASTER.

No. 519,259.　　　　　　　　　Patented May 1, 1894.

Witnesses:
Jas. E. Hutchinson.
Henry C. Hazard.

Inventor.
Henry C. Higginson, by
Prindle and Russell, his Attys.

THE NATIONAL LITHOGRAPHING COMPANY,
WASHINGTON, D. C.

UNITED STATES PATENT OFFICE.

HENRY C. HIGGINSON, OF NEWBURG, NEW YORK.

MANUFACTURE OF PLASTER.

SPECIFICATION forming part of Letters Patent No. 519,259, dated May 1, 1894.

Application filed June 9, 1893. Serial No. 477,103. (No specimens.)

*To all whom it may concern:*

Be it known that I, HENRY C. HIGGINSON, of Newburg, in the county of Orange, and in the State of New York, have invented certain new and useful Improvements in the Manufacture of Plaster; and I do hereby declare that the following is a full, clear, and exact description thereof, reference being had to the accompanying drawings, in which—

Figure 1:
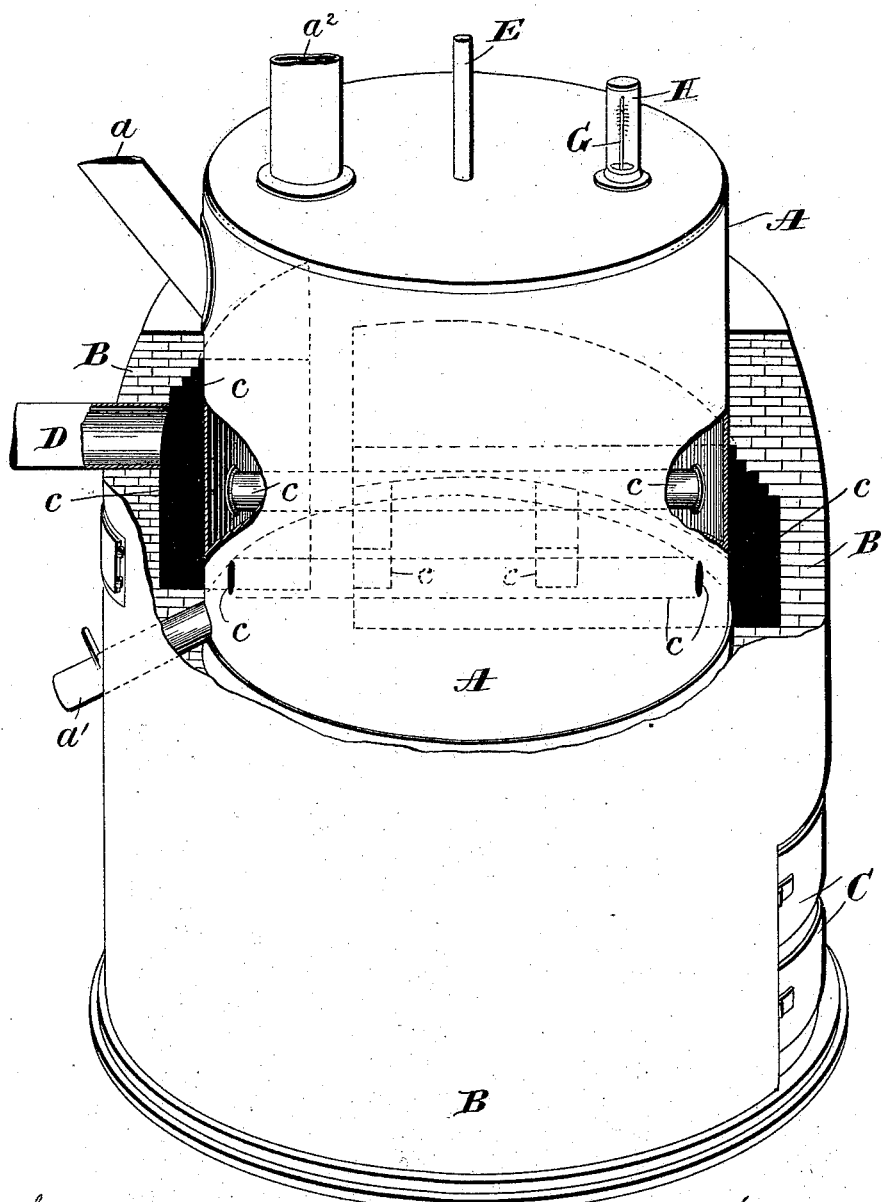
Figure 2:
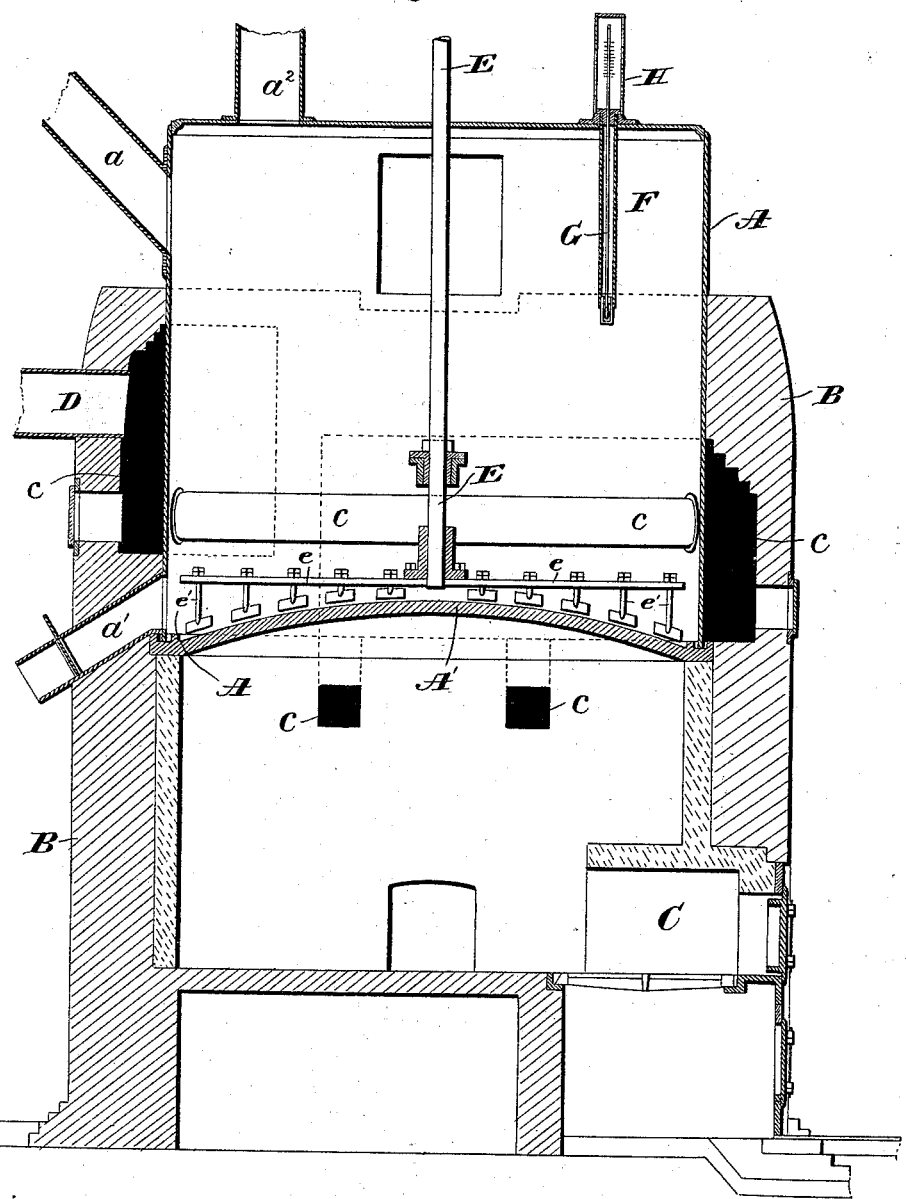

Figure 1 is a perspective view of the apparatus preferably employed, a portion of the same being broken away to show the interior construction, and Fig. 2 is a vertical, central section of such apparatus.

Letters of like name and kind refer to like parts in each of the figures.

In the manufacture of plaster, much difficulty has been experienced in producing an article which was uniform in quality, one lot being apt to set quickly and another lot slowly. To obviate this difficulty is the object of my invention—which invention consists in the method employed, substantially as and for the purpose hereinafter specified.

In the carrying of my invention into practice, I preferably employ the calcining mechanism shown, which consists of a metal kettle A that has the general form of a cylinder, with its bottom A' arched or dome shaped. Said kettle is inclosed by brickwork B and within such casing, beneath the kettle, is provided a furnace C that has such construction as to enable any desired quantity or kind of fuel to be burned therein and by means of flues $c$ and $c$—which pass around or through said kettle and finally connect with a smoke flue D—enable the heated gases of combustion to communicate their heat to the interior of the kettle. Near the upper end, at one side of the kettle A is a pipe $a$ through which plaster may be inserted into the same, and at its lower end is provided a discharge pipe $a'$ that extends downward and outward from one side, while from some point within the top a pipe $a^2$, for the escape of vapor, extends upward, as shown. In order that the contents of the kettle may be properly agitated so as to prevent clogging and cause each particle to receive its proportion of heat, a shaft E is journaled vertically within the center of the kettle and upon its lower end is provided with radial arms $e$ and $e$ that have each a number of dependent blades $e'$ and $e'$ which, when said shaft is revolved, pass close to the bottom A' and thoroughly agitate the material resting thereon.

When the plaster is first placed within the kettle, its temperature rises until it reaches its maximum and violent boiling results, after which—in consequence of the vapor produced—the temperature falls for a time and then, under the constant application of heat again rises. I have found that the best and most uniform results are obtained by limiting the range from 365° to 395° and finally discharging the plaster at a temperature of 380°. To secure such result, I place within the top of the kettle A a tubular casing F which extends downward into the interior and contains a thermometer G. Said thermometer extends sufficiently above said kettle to enable the upper portion of the column of mercury to be seen and its fluctuations noted and such portion is, preferably, inclosed by means of a glass casing H.

With mechanism thus constructed, the operator inserts a charge of plaster into the properly heated kettle and then sets the stirring mechanism in motion and after the temperature has reached its maximum has fallen to its minimum and has again reached 380°, discharges the plaster perfectly calcined. When thus treated any number of charges of plaster made from the same rock will possess precisely the same qualities, will require the same percentage of water and will set in the same time.

Having thus described my invention, what I claim is—

1. The method of calcining plaster which consists in heating it within a kettle to a temperature of about 395°, permitting it to cool to a temperature of about 365°, then giving it a temperature of about 380° and finally discharging it at such temperature, substantially as and for the purpose specified.

2. The method of calcining plaster which consists in boiling it within a suitable vessel, preventing the temperature rising above 395° and falling below 365°, and removing it from such vessel at a temperature of 380°, substantially as and for the purpose shown.

In testimony that I claim the foregoing I have hereunto set my hand this 16th day of May, 1893.

HENRY C. HIGGINSON.

Witnesses:
WILLIAM H. HYNDMAN,
GEORGE H. TAGGART.